United States Patent Office 3,139,409
Patented June 30, 1964

3,139,409
PROCESS FOR THE PRODUCTION OF
SILARYLENE POLYMERS
Alexander Marshall Meston, Saltcoats, Scotland, assignor to Imperial Chemical Industries Limited, London, England, a corporation of Great Britain
No Drawing. Filed Dec. 30, 1960, Ser. No. 79,524
Claims priority, application Great Britain Jan. 8, 1960
12 Claims. (Cl. 260—2)

This invention relates to polymeric materials and more particularly to a new and improved process for the production of polymeric materials containing silicon.

A wide variety of polymeric materials containing silicon are known and many of these are widely used because of their many valuable and advantageous properties. One class of polymer which has hitherto been widely used is that in which the baisc chain structure is formed by a series of alternating arylene groups and silicon atoms, i.e. the so-called silarylene polymers. These polymers have been prepared by a variety of methods. All of the methods hitherto proposed have, however, suffered from one or more serious disadvantages. Thus in some cases the use of high temperatures is necessary, while others require high pressure and in some cases, materials of irregular structures are obtained. In general, the hitherto available processes have resulted only in low yields of the desired materials.

An object of the present invention is to provide a process for the production of silarylene polymers. Another object is to provide such a process which can be easily and economically operated and which gives good reproducibility. Other objects will appear hereinafter.

According to the present invention these objects are accomplished by a process comprising reacting one or more organosilicon compounds having the general formula

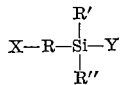

where X and Y, which may be the same or different, are halogens, R is a m- or p-phenylene group or a diphenylene group and R' and R", which may be the same or different, are alkyl, aryl, alkaryl, aralkyl or alkenyl groups, with a metal selected from the group consisting of sodium and magnesium.

A wide variety of haloaryl halosilanes can be used in the process of our invention. It is, however, in many cases, convenient to use those in which X is bromine and Y is chlorine. The groups R' and R", which may be the same or different, may be alkyl groups such as methyl, ethyl or propyl groups, aryl groups such as phenyl groups, alkaryl groups such as tolyl groups, aralkyl groups such as benzyl groups or alkenyl groups such as vinyl or allyl groups. It has, however, been found that compounds in which R' and R" are both methyl groups are advantageous in forming polymers of high molecular weight while those in which R' and R" are phenyl groups give polymers having the advantage of high heat stability.

While the metal to be used in the process of our invention may be sodium or magnesium it is normally preferred to use sodium as this gives increased yields of good quality product.

The relative proportions of haloaryl halosilane and metal used in the process of our invention may vary within wide limits. It is, however, normally preferred to use the metal in an amount in excess of the stoichiometrical proportion. It is also normally preferred that the reaction should be carried out in an inert solvent and that the metal should be in a finely divided form having a large surface area.

The reaction may be carried out at temperatures within the range from 0° C. to 200° C. and it is, in fact, in many cases preferred to react at a temperature of the order of 110° C. The reaction is also normally carried out at atmospheric pressure, although if desired, super or sub-atmospheric pressures may be used. There is, however, in general, no advantage therein. It is also in many cases, convenient to carry out the reaction in an inert atmosphere, for example, in an atmosphere of nitrogen.

Our invention is further illustrated by the following examples in which all parts are by weight.

Example 1

30 parts of sodium, 1000 parts of dry toluene and 1 part of oleic acid were fed into a reaction vessel equipped with a stirrer and reflux condenser. The contents of the vessel were heated until the toluene boiled. Stirring was started and continued at a rate such that droplets of liquid sodium were suspended in the toluene. 187 parts of (p-bromophenyl)-diphenylchlorosilane dissolved in 500 parts of toluene, were then gradually added to the reaction vessel. The addition was completed over a period of two hours and heating and stirring continued for one hour longer. The reaction mixture, which contained a blue precipitate, was cooled and poured into 1500 parts of ethanol. The mixture was then filtered, the precipitate boiled with water and dried at 100° C. This product was free from halogen and melted above 410° C. Further purification was carried out by extraction with xylene, washing with n-hexane and drying. This gave 70 parts of a white solid powder melting about 420° C. and having the analysis: carbon 83.32, hydrogen 6.90 and silicon 10.05 percent. The calculated analysis for the polymer $(C_6H_4SiPh_2)_n$ is carbon 83.73, hydrogen 5.43 and silicon 10.85 percent. This polymer, which was useful as a component of surface coating compositions, was found to be thermally stable by heating for a period of 8 hours at 300° C. in an atmosphere of nitrogen during which time no loss of weight occurred.

Example 2

A mixture of sodium in boiling toluene was prepared as in Example 1. 125 parts of (p-bromophenyl)-dimethylchlorosilane dissolved in 500 parts of toluene were then gradually added over a period of 1 hour to the reaction mixture. Refluxing and stirring of the reaction mixture was continued for a further two hours. The reaction mixture was cooled, poured into 1500 parts of ethanol and the white precipitate which formed collected, boiled with water and dried at 100° C. There was thus obtained 20 parts of a polymer melting at about 167 to 176° C. This polymer did not react with boiling aqueous sodium hydroxide and dissolved readily in cold benzene. A sample thereof was further purified by dissolving in hot n-butanol and reprecipitating therefrom by cooling. This material was found to have a molecular weight of 21,490 (determined by a cryoscopic method) and to have the analysis: carbon 68.25, hydrogen 7.74 and silicon 20.97 percent. The calculated analysis for the polymer

is carbon 71.64, hydrogen 7.46 and silicon 20.89 percent. The polymer obtained was capable of forming useful films and fibres.

Example 3

The procedure of Example 1 was followed except that 164.5 parts of (p-chlorophenyl)-diphenylchlorosilane were used in place of the silane of Example 1. The product obtained was purified in the same way as that of Example 1. 24 parts of a white solid polymer melting at about 393° C. were obtained. This was similar to the product of Example 1.

*Example 4*

20 parts of sodium, 750 parts of toluene and 1 part of oleic acid were fed into a reaction vessel of the type used in Example 1 and the mixture heated to the boiling temperature of the toluene. 100 parts of (p-bromophenyl)-dibenzylchlorosilane dissolved in 750 parts of toluene were gradually added and the mixture reacted in the manner described in Example 2. The reaction mixture was thereafter cooled and poured into 1500 parts of ethanol. This caused separation of an oil. 750 parts of chloroform were added to dissolve the oil and the chloroform-alcohol-toluene solution was washed with water, dried over anhydrous sodium sulphate and the solvents removed by distillation under reduced pressure. The residue from this distillation was a clear, yellow, non-volatile oil. This oil was dissolved in boiling n-butanol and on cooling there separated from the solution a white solid, melting within the temperature range 50 to 100° C. and having an average molecular weight of about 3,900. This was useful as a lubricant or hydraulic fluid at high temperatures.

*Example 5*

60 parts of sodium, 2000 parts of toluene and 2 parts of oleic acid were fed into a reaction vessel of the type used in Example 1 and the mixture heated to the boiling temperature of the toluene. 187 parts of (p-bromophenyl)-diphenylchlorosilane and 125 parts of (p-bromophenyl)-dimethylchlorosilane dissolved in 1000 parts of toluene were added to the reaction vessel over a period of 1.5 hours. Heating and stirring were continued for a further 5 hours. The mixture was then poured into 3000 parts of ethanol and the white precipitate obtained filtered off, washed with water and dried at 110° C. This gave 110 parts of a white solid melting in the temperature range 130 to 170° C. This polymer was soluble in cold benzene and slightly soluble in boiling n-butanol. It could be used as a component of surface coating resins.

*Example 6*

164.5 parts of (p-chlorophenyl)-diphenylchlorosilane in 1000 parts of toluene were added to a reaction vessel of the kind used in Example 1. The air in the reaction vessel was displaced by nitrogen and the vessel heated until the toluene boiled. 46 parts of sodium dispersed in 300 parts of toluene were slowly added to the stirred contents of the reaction vessel over a period of 45 minutes. The reaction mixture was heated for a further 2 hours after which it was cooled, treated with 50 parts of ethanol and poured into 1500 parts of ethanol. The precipitate obtained was filtered off, washed with water, dried and extracted with xylene. This gave 70 parts of a brown resinous polymer melting between 390 and 400° C., useful as a component of surface coating compositions.

*Example 7*

A reaction vessel of the type used in Example 1 was flushed with nitrogen and a dispersion of 46 parts of sodium in 300 parts of toluene added thereto, after which it was heated to 80° C. 125 parts of (p-bromophenyl)-dimethylsilane in 500 parts of toluene were gradually added to the reaction mixture over a period of 1 hour. The reaction mixture was then cooled, 50 parts of ethanol added and the whole poured into 1000 parts of ethanol. The precipitate formed was collected, washed with water, dried and re-crystallised twice from n-butanol. There was thus obtained 25 parts of a polymer melting at about 146° C. and having a molecular weight of 2,920, capable of forming films.

*Example 8*

46 parts of sodium dispersed in 300 parts of toluene were fed into a reaction vessel of the type used in Example 1 and which had previously been flushed with nitrogen. The contents of the reaction vessel were heated to 80° C. and 0.1 part of amyl alcohol added thereto. 186 parts of (p-bromophenyl)-diphenylchlorosilane in 1000 parts of toluene were gradually added to the reaction vessel at a rate such that the reaction temperature remained in the range 90 to 95° C. After completion of the addition the reaction mixture was boiled for 30 minutes. Ethanol was added to the reaction mixture until gas evolution ceased, after which the reaction mixture was poured into 3000 parts of ethanol. The precipitate obtained was filtered off, washed with water and dried at 110° C. to give 125 parts of a white solid. This solid was extracted with xylene, washed with n-hexane and dried. There was thus obtained 115 parts of a white solid polymer melting at about 430° C., useful as a component of surface coating compositions.

*Example 9*

30 parts of sodium in 1000 parts of toluene were fed into a reaction vessel of the type used in Example 1 and heated to boiling, 156 parts of p-bromophenyl-chloromethylphenylsilane in 500 parts of toluene were added and the mixture heated under reflux while stirring for a period of 7 hours. The reaction mixture was cooled and poured into 1500 parts of ethanol causing separation of an oily material. 1000 parts of chloroform were added to this mixture and the organic layer removed, washed and dried. The solvents were removed by distillation to yield an oily material which set to an amber-coloured resin. This product which was soluble in benzene, was recrystallised from n-butanol to give a white solid melting at 135–160° C. This material was capable of forming fibres.

*Example 10*

120 parts of m-bromophenyl-chlorodiphenylsilane were reacted with 30 parts of sodium in a similar manner to that of Example 9. The reaction mixture was cooled and poured into 1500 parts of methanol. The white precipitate which formed was collected, boiled with water and dried at 100° C. This gave 66 parts of a white solid insoluble in hot cyclohexane or n-butanol but soluble in boiling benzene and xylene. The solid was recrystallised from benzene to give a purified material melting at 185–195° C. This material was useful as a component of surface coating compositions.

*Example 11*

125 parts of m-bromophenyl-chlorodimethylsilane were reacted with 30 parts of sodium in boiling toluene in the manner described in Example 9. The reaction mixture was cooled and poured into 1500 parts of ethanol and extracted with ether. The ether extract was washed, dried and the solvent removed by distillation to give a viscous orange oil soluble in n-butanol and of molecular weight 890. This material was of value as a hydraulic fluid of low volatility.

*Example 12*

A mixture of 124 parts of m-bromophenyl-chlorodiphenylsilane and 124 parts of p-bromophenyl-chlorodiphenylsilane was reacted with 40 parts of sodium in toluene in the manner described in Example 9. The reaction mixture was cooled and added to 1500 parts of methanol whereupon there was obtained a precipitate of an insoluble white solid. This was dissolved in benzene, the solution filtered and the benzene removed by distillation to give a brittle amber coloured solid softening at 160° C. and melting at 210–250° C. This material was of value for surface coating compositions.

*Example 13*

120 parts of 4-bromo-4'-chlorodimethylsilyl-diphenyl was reacted with 20 parts of sodium in boiling toluene in the manner described in Example 9 for a period of 15 hours. The reaction mixture was then poured into 1000 parts of methanol and the precipitate formed collected, washed and dried to give a yellow infusible solid byproduct. The organic filtrate gave on removal of the solvent a soft solid product which on recrystallising from methanol gave hard crystals softening at 105° C. and melting at 120–130° C. This material was soluble in benzene and was useful as an involatile hydraulic fluid for use at high temperatures.

What I claim is:

1. A process for the production of silarylene polymers comprising reacting in an inert solvent at least one organosilicon compound having the formula

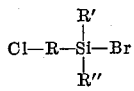

wherein R is selected from the group consisting of m-phenylene, p-phenylene and diphenylene groups, and R' and R'' are selected from the group consisting of alkyl, aryl, alkaryl, aralkyl, and alkenyl groups, with a finely divided metal having a large surface area and selected from the group consisting of sodium and magnesium.

2. A process as claimed in claim 1 wherein R is a p-phenylene group, and R' and R'' are the same and are methyl groups.

3. A process as claimed in claim 1 wherein R is a p-phenylene group, and R' and R'' are the same and are phenyl groups.

4. A process as claimed in claim 1 wherein R is a p-phenylene group, R' is a methyl group, and R'' is a phenyl group.

5. A process as claimed in claim 1 wherein R is a p-phenylene group, R' is a methyl group, and R'' is a vinyl group.

6. A process as claimed in claim 1 wherein R is a p-phenylene group, R' is a methyl group, and R'' is an allyl group.

7. A process as claimed in claim 1 wherein the reaction is carried out at a temperature of from 0° C. to 200° C.

8. A process as claimed in claim 7 wherein the temperature is of the order of 110° C.

9. A process as claimed in claim 1 wherein R' and R'' are the same and are phenyl groups.

10. A process as claimed in claim 1 wherein R' is a methyl group and R'' is a phenyl group.

11. A process as claimed in claim 1 wherein R' is a methyl group and R'' is a vinyl group.

12. A process as claimed in claim 1 wherein R' is a methyl group and R'' is an allyl group.

References Cited in the file of this patent
UNITED STATES PATENTS

| | | |
|---|---|---|
| 2,352,974 | Rouchou | July 4, 1944 |
| 2,483,972 | Goodwin | Oct. 4, 1949 |
| 2,910,495 | George | Oct. 27, 1959 |